United States Patent
McCourt

(10) Patent No.: US 8,150,727 B2
(45) Date of Patent: Apr. 3, 2012

(54) CONTENT AND ADVERTISING MATERIAL SUPERDISTRIBUTION

(75) Inventor: Brian McCourt, Hopatcong, NJ (US)

(73) Assignee: Free All Media LLC, Hopatcong, NJ (US)

( * ) Notice: Subject to any disclaimer, the term of this patent is extended or adjusted under 35 U.S.C. 154(b) by 799 days.

(21) Appl. No.: 12/129,256

(22) Filed: May 29, 2008

(65) Prior Publication Data

US 2009/0182621 A1    Jul. 16, 2009

Related U.S. Application Data

(60) Provisional application No. 61/020,980, filed on Jan. 14, 2008.

(51) Int. Cl.
*G06Q 40/00* (2006.01)

(52) U.S. Cl. .............. 705/14; 84/609; 705/10; 705/14.5; 705/14.47; 705/14.49; 705/14.55; 705/14.61; 705/14.64; 705/39; 705/44; 705/51; 705/52; 705/59; 705/71; 705/218; 705/219; 713/189; 725/109; 726/1

(58) Field of Classification Search .................. None
See application file for complete search history.

(56) References Cited

U.S. PATENT DOCUMENTS

| | | | | |
|---|---|---|---|---|
| 5,634,012 A | * | 5/1997 | Stefik et al. | 705/39 |
| 5,715,403 A | * | 2/1998 | Stefik | 705/44 |
| 5,974,398 A | | 10/1999 | Hanson et al. | |
| 6,363,488 B1 | * | 3/2002 | Ginter et al. | 726/1 |
| 6,632,992 B2 | * | 10/2003 | Hasegawa | 84/609 |
| 6,983,371 B1 | * | 1/2006 | Hurtado et al. | 713/189 |
| 7,149,722 B1 | * | 12/2006 | Abburi | 705/59 |
| 7,505,760 B2 | * | 3/2009 | Hurst et al. | 455/414.1 |
| 2001/0049824 A1 | * | 12/2001 | Baker et al. | 725/109 |
| 2001/0051925 A1 | * | 12/2001 | kang | 705/51 |
| 2002/0132612 A1 | | 9/2002 | Ishii | |
| 2002/0184097 A1 | * | 12/2002 | Hijiri et al. | 705/14 |
| 2003/0014310 A1 | * | 1/2003 | Jung et al. | 705/14 |

(Continued)

FOREIGN PATENT DOCUMENTS

WO    WO 2007/101078    *  9/2007

OTHER PUBLICATIONS

Chong, Daniel et al. Privacy-Enhanced Superdistribution of Layered Content with Trusted Access Control. Proceedings of the ACM Workshop on Digital Rights Management . ACM New York, NY, USA ©2006. ISBN:1-59593-555-X.*

(Continued)

*Primary Examiner* — Harish T Dass
*Assistant Examiner* — Robert Niquette
(74) *Attorney, Agent, or Firm* — Marc S. Kaufman; Reed Smith LLP

(57) ABSTRACT

Embodiments provide content and advertising material superdistribution. In one embodiment, a method of distributing content and advertising material may be provided. The method may include: registering members who are potential users and distributors of content; receiving, from a first member, an identifier of a second member with whom the first member has a relationship; receiving, from the first member, a selection of content to be distributed to the second member; receiving, from the first member, a selection of advertising material to be associated with the content to be distributed to the second member; and distributing the content and the advertising material to the second member.

18 Claims, 4 Drawing Sheets

U.S. PATENT DOCUMENTS

| | | | |
|---|---|---|---|
| 2005/0021398 A1* | 1/2005 | McCleskey et al. | 705/14 |
| 2005/0027821 A1* | 2/2005 | Alexander et al. | 709/218 |
| 2005/0091173 A1* | 4/2005 | Alve | 705/71 |
| 2005/0125354 A1* | 6/2005 | Pisaris-Henderson et al. | 705/52 |
| 2006/0059045 A1* | 3/2006 | Babbar et al. | 705/14 |
| 2006/0155647 A1* | 7/2006 | Bodlaender et al. | 705/51 |
| 2007/0112628 A1* | 5/2007 | Lombardo | 705/14 |
| 2007/0130010 A1* | 6/2007 | Pokonosky | 705/14 |
| 2007/0156534 A1* | 7/2007 | Lerner et al. | 705/14 |
| 2007/0162335 A1* | 7/2007 | Mekikian | 705/14 |
| 2007/0179898 A1* | 8/2007 | Medvinsky et al. | 705/59 |
| 2007/0198660 A1* | 8/2007 | Cohen | 709/219 |
| 2007/0299780 A1* | 12/2007 | Vanska et al. | 705/59 |
| 2008/0010153 A1* | 1/2008 | Pugh-O'Connor et al. | 705/14 |
| 2008/0109298 A1* | 5/2008 | Barton | 705/10 |
| 2008/0195546 A1* | 8/2008 | Lilley | 705/59 |

OTHER PUBLICATIONS

International Search Report PCT/US09/30809 dated Feb. 20, 2009.

* cited by examiner

CONTENT AND ADVERTISING MATERIAL SUPERDISTRIBUTION

RELATED APPLICATION DATA

This application claims benefit from Provisional Application Ser. No. 61/020,980 filed on Jan. 14, 2008, the entire disclosure of which is incorporated herein by reference.

FIELD

The present invention is generally directed to content distribution and more particularly to content and advertising material superdistribution.

BACKGROUND

Digital content is prolific and may take many forms. For example and not by limitation, content may include music, movies, television shows, pictures, books and games. Distribution of content may also take many forms.

In one content distribution model, a user may login into a system, choose a content item for download from a peer, and receive the content item from the peer. The user may not have to pay for the content item. However, the peer may be an unfriendly peer which may expose the user to risk. Also, the owner of the content (e.g., a music artist) may not receive compensation for the download. "Peer to Peer" systems have proven to be prolific mechanisms for content distribution because they permit users to become super-distributors, i.e, users can send content to other users. However, since such systems do not have a reliable mechanism for compensating the content owner, they do not present adequate business models for content distribution.

In another content distribution model, a user may login to a system, choose a content item for download from a secure location, pay for the content item, and receive the content item. The download may come from a secure location. The content owner may receive compensation for the download. However, in this type of model, a user may have to pay for the content item. Also a user may have no or limited ability to distribute the content to others.

Another mechanism for distribution content is similar to the secure method disclosed above, except that costs for the content are paid, at least in part, by an advertiser. The advertiser's advertisement is then distributed with the content. Advertisers select content or user demographic groups for distribution of their advertisements. In other words, the advertisers target their own advertisements. In some cases, a user has a limited selection of advertisements that they select for viewing upon download of content to their own device. However, such systems do not allow users to act as super distributors. Accordingly, the impact and effectiveness of the advertisements is limited.

Known content distribution models have limitations with regard to meeting the interests of users, artists (or other content item rights holders), and advertisers.

SUMMARY

A preferred embodiment is an online system and method in which members subscribe to be consumers and distributors of content, music for example. A member provides information related to artists/authors ("bands"), friends and other acquaintances ("fans"), and products/services ("brands"). Significantly, members are not just consumers of content but can be superdistributors of content (entertainment and advertising). The system leverages the members' relationships with acquaintances to permit distribution of content that a recipient will desire along with advertisements for products and services that the recipient will likely be interested in.

When acting as a super distributor, a member can select content, a song in this example, to be sent to a particular friend as a music consumer. The member also selects an advertisement that is to be appended to the song and viewed by the friend prior to listening to the song. The music consumer will then receive the song packed with the advertisement and a message that indicates the friend, as super distributor, recommends the song and the advertisement. The consumer then view/listens to the advertisement prior to downloading or listening to the song. Revenue for the advertiser can be used to compensate the content owner in whole or in part for the distribution of the song.

Significantly, the song and the advertisement are selected by the super distributor, who is a friend of, or otherwise has a personal relationship with, the consumer. The recommendation of the super distributor/friend is likely to be persuasive to the recipient and thus the recipient is likely to view the advertisement. The recipient can also act as a super distributor to send the same song/ad/message to others. In this manner, the system leverages personal relationships to deliver targeted content and advertisements to receptive consumers.

Accordingly, benefits may flow to fans, brands, and bands. Fans may receive free digital music/media and have the ability to distribute digital music/media to their network of friends (other fans) by joining the site and using the application. Brands may receive exposure to new consumer markets via fans that have selected brands (as brands they prefer) and exposure to new markets with the endorsement of friends (super endorsement). Finally, bands (i.e., content owners such as record labels and artists) may receive compensation without concern for copyright infringement or piracy.

According to one aspect of the invention, a method of distributing content and advertising material may be provided. The method may include: registering members who are potential users and distributors of content; receiving, from a first member, an identifier of a second member with whom the first member has a relationship; receiving, from the first member, a selection of content to be distributed to the second member; receiving, from the first member, a selection of advertising material to be associated with the content to be distributed to the second member; and distributing the content and the advertising material to the second member.

These and other advantages, aspects, and features will become more apparent from the following detailed description of embodiments and implementations when viewed in conjunction with the accompanying drawings. The present invention is also capable of other embodiments and different embodiments, and details can be modified in various respects without departing from the spirit and scope of the present invention. Accordingly, the drawings and descriptions below are to be regarded as illustrative in nature, and not as restrictive.

DETAILED DESCRIPTION

Figure 1:
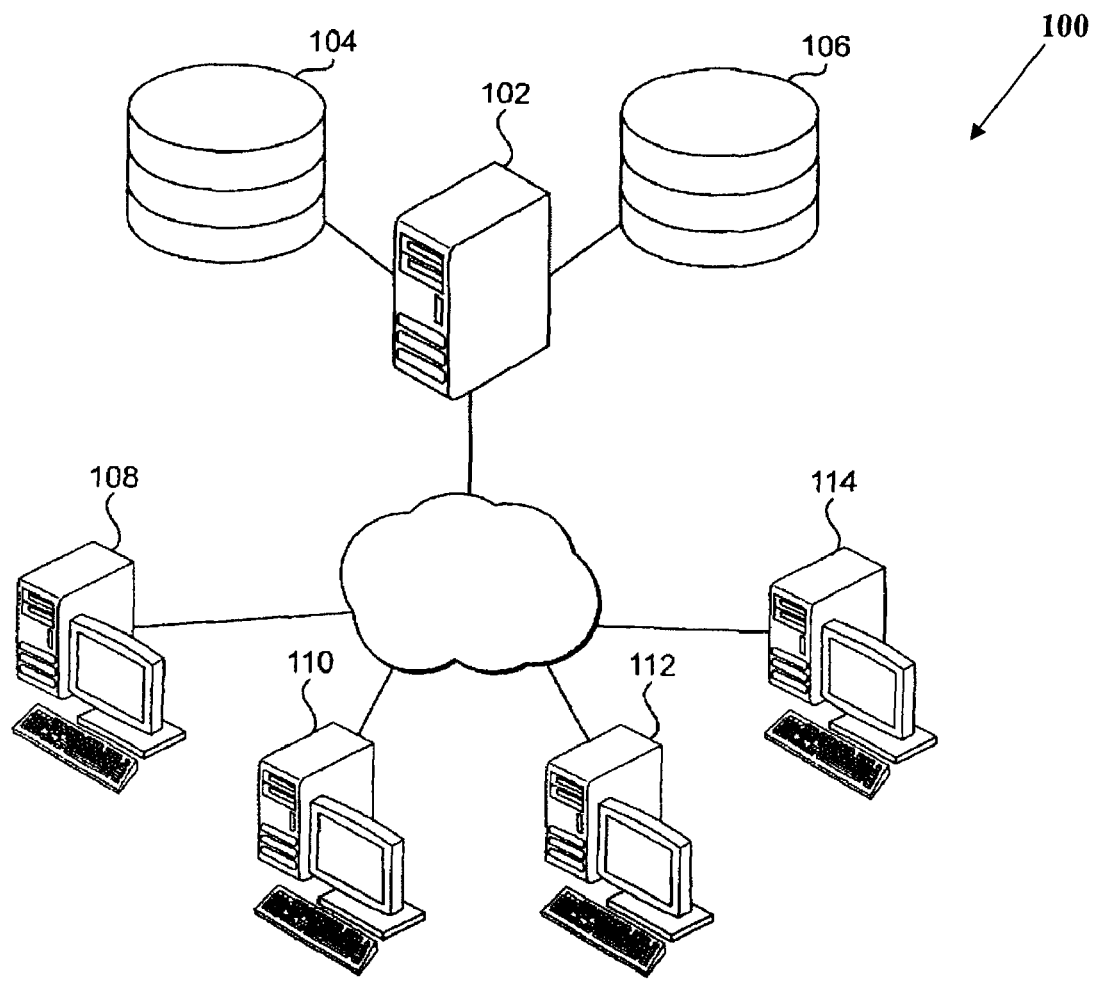
FIG. 1 is a schematic representation of a content and advertising material superdistribution system 100 according to one embodiment of the present invention.

Reference is made below to embodiments of the present invention, examples of which are illustrated in the accompanying drawings, where like reference numerals refer to like elements throughout. The embodiments are described below to explain the present invention by referring to the figures.

As used in this application, the terms "a", "an" and "the" may refer to one or more than one of an item. The terms "and" and "or" may be used in the conjunctive or disjunctive sense and will generally be understood to be equivalent to "and/or". For brevity and clarity, a particular quantity of an item may be described or shown while the actual quantity of the item may differ.

Embodiments of the present invention provide content and advertising material superdistribution. A member may identify a music artist, another member, and an advertiser that the member may like. In exchange for identifying an advertiser that the member likes, the member may receive a content item with an advertisement from the advertiser identified by the member. The member may also designate another member to receive the content file with an advertisement, the same advertisement or a different advertisement. The member can select music and an advertisement that he believes the second member will find of interest. Content may be paid for, in whole or in part, by the advertiser, who may aspire to promulgate advertisements. Members may affiliate with a music artist, select and download a content item, watch the included advertisement, and thereafter enjoy the content item themselves, or forward along to other members who may enjoy the content item after watching an advertisement. Members may thus form communities of members, advertisers and music artists. Advertisers may target these member created communities. However, the advertisements are inherently targeted because the members self-select content and advertisements in which they and their friends are interested. This allows the system to leverage the knowledge members have of other members by virtue of their personal relationships.

FIG. 1 is a schematic representation of a content and advertising material superdistribution system 100 according to one embodiment. The system 100 may include an interface 102 that may be connected to a staging database 104 and a production database 106. The system 100 may include a first member computing device 108, an artist computing device 110, an advertiser computing device 112, and a second member computing device 114. The first member computing device 108, the artist computing device 110, the advertiser computing device 112, and the second member computing device 114 may be connected to the interface 102. Of course, there can be any number of members and associated member devices.

The interface 102 may be a website hosted on a computing device. The first member computing device 108, the artist computing device 110, the advertiser computing device 112, and the second member computing device 114 may be connected to the interface via the Internet or any other appropriate communications channel, such as a local area network (LAN), a wide area network (WAN), direct computer connections, and the like, and may be connected in a wireless manner using radio frequency, infrared, or other communications technologies, using any type of communication hardware and protocols.

The interface 102 may be configured such that no browser-related software beyond Java or Javascript may be needed on the first member computing device 108, the artist computing device 110, the advertiser computing device 112, or the second member computing device 114 in order to view the interface 102.

The staging database 104 and the production database 106 may be databases accessible to the website hosted on the computing device. Data stored in the staging database 104 and the production database 106 may be protected. For example and not by limitation, content (e.g., music files) stored in the production database 106 may be protected from unpermitted downloads using appropriate protection software and hardware.

The first member computing device 108, the artist computing device 110, the advertiser computing device 112, and the second member computing device 114 may be implemented with any type of hardware and software, and may include pre-programmed general purpose computing devices. For example, the first member computing device may be implemented using a server, a personal computer, a portable computer, a thin terminal, a hand held device, a wireless device, or any combination of such devices.

Figure 2:
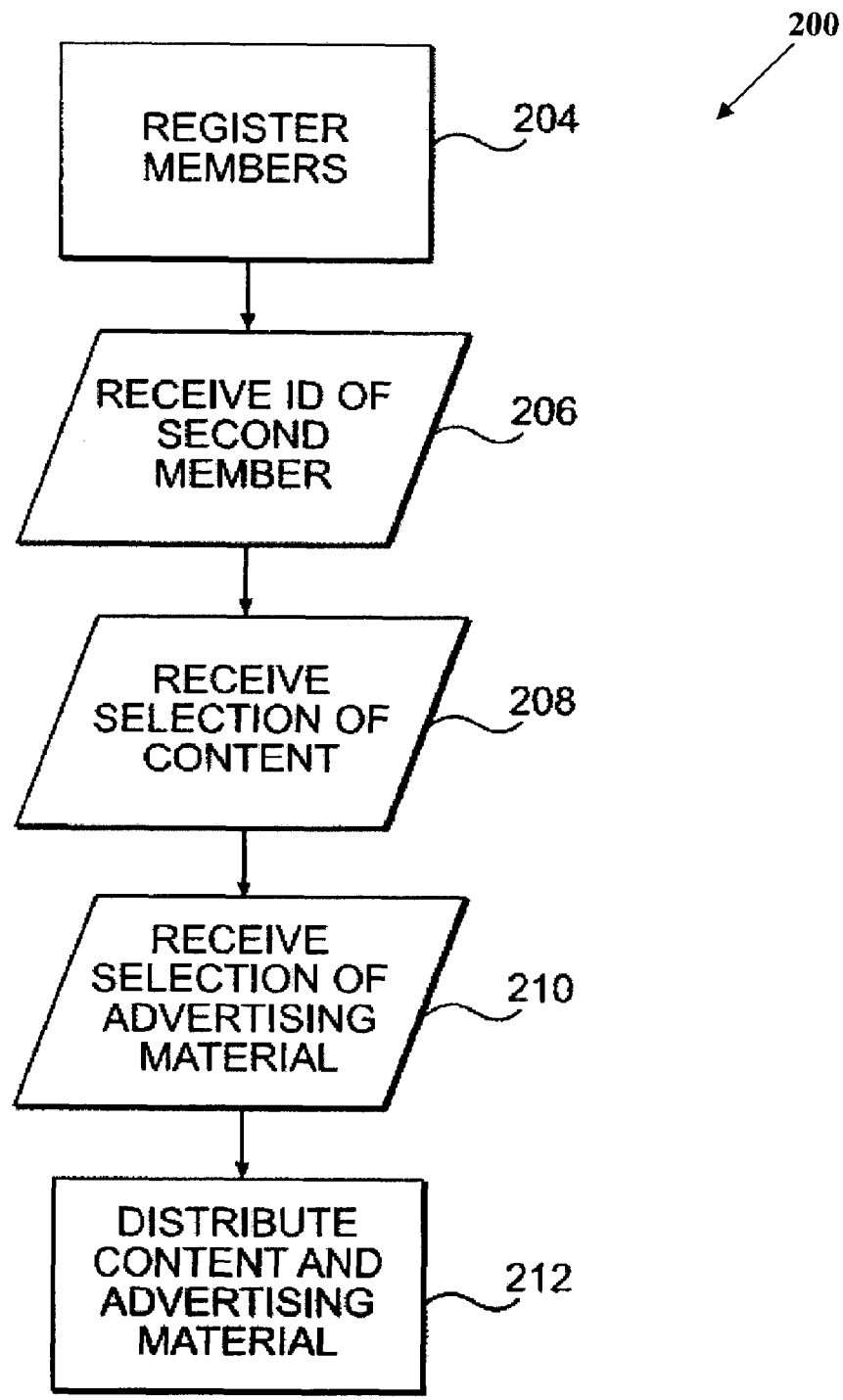
FIG. 2 is a schematic representation of an exemplary method 200 of distributing content and advertising material according to one embodiment of the present invention.

The operation of the content and advertising material superdistribution system 100 is now described with reference to FIGS. 2 through 4. FIG. 2 is a schematic representation of an exemplary method 200 of distributing content and advertising material according to one embodiment of the present invention.

In operation 204, members who are potential users and distributors of content may be registered. For example, a first and second member may use the first and second member computing devices 108, 114 to communicate with the interface 102 to register with the system 100. In operation 206, an identifier of the second member with whom the first member has a relationship (a friendship, for example) may be received from the first member via the first member computing device 108. The identifier of the second member may be obtained by selecting from amongst a list of members displayed on the first member computing device 108.

In operation 208, a selection of content to be distributed to the second member via the second member computing device 114 may be received from the first member. In operation 210, a selection of advertising material to be associated with the content to be distributed to the second member may be received from the first member via the first member computing device 108. The selection of advertisers or advertising material, i.e. brands, to be associated with the content may be from amongst a list of advertisers displayed on the first computing device 108.

In operation 212, the content and the advertising material may be distributed to the second member via the second member computing device 114. The distribution of the content and advising material may include rendering the advertising material to the second member prior to rendering the content. The advertising material may be rendered on the second member computing device 114 while the content is being distributed, i.e., downloaded, to the second member computing device 114.

Figure 3:
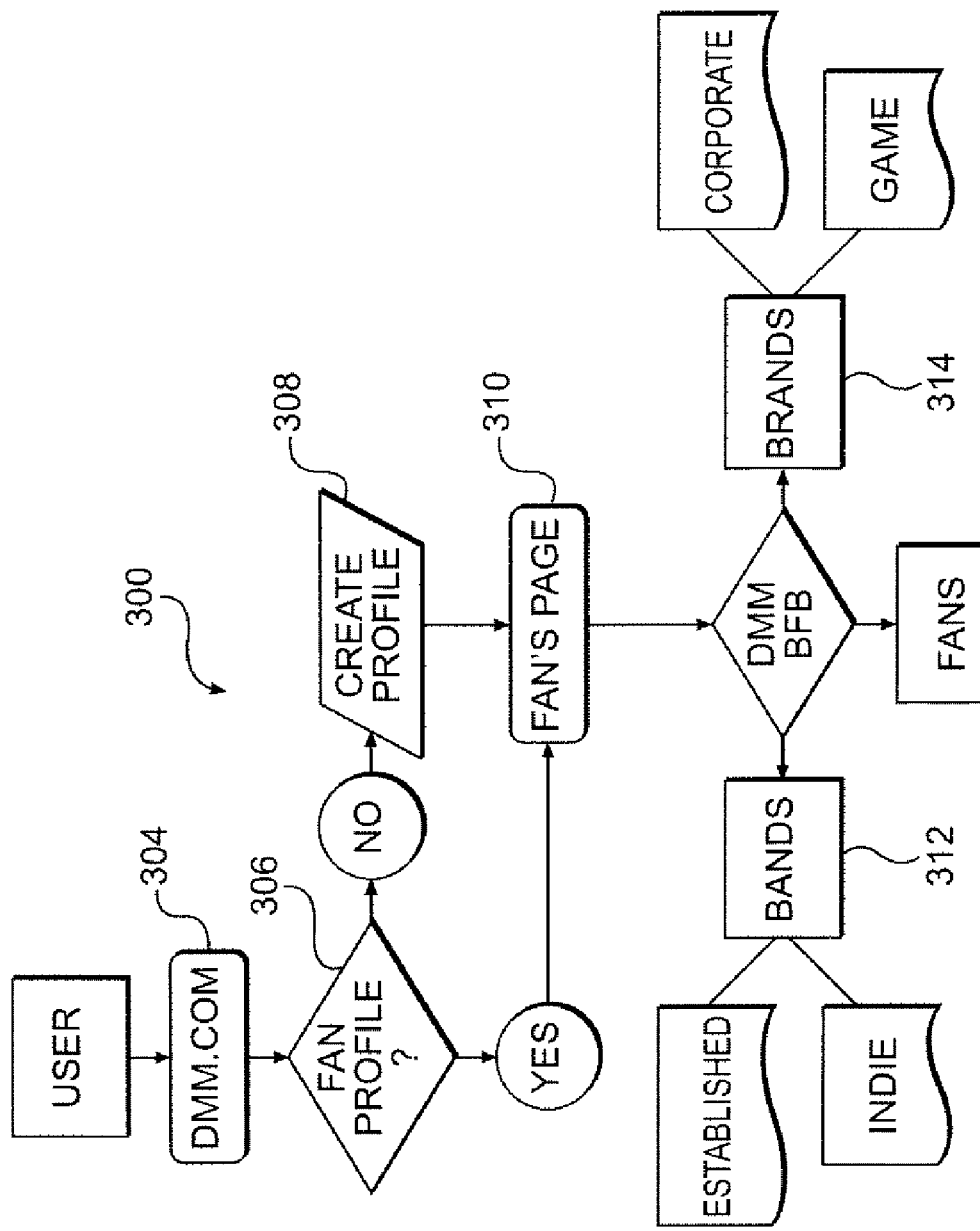
FIG. 3 is a schematic representation of an exemplary method 300 of distributing digital music and advertising material according to one embodiment of the present invention.

FIG. 3 is a schematic representation of an exemplary method 300 of distributing digital music and advertising material according to one embodiment of the present invention. FIG. 4 is a schematic representation of an exemplary method 400 of creating a member profile and fanpage, such as operations 308 and 310 of FIG. 3. These methods are described below from the perspectives of a member, a music artist, and a brand.

Member Use

In operation 304, a user may use the first member computing device 108 to connect to the web site of the interface 102. In operation 306, a determination may be made whether the user is already a member (e.g., a "fan") of the content and advertising material superdistribution system 100.

If, in operation 306, a determination is made that the user is not a member, the method 300 may proceed to operation 308. In operation 308, the user may be prompted by the interface 102 to create a profile in order to become a member. A profile may be created as discussed below with reference to FIG. 4. Thereafter, the method 300 may proceed to operation 310. If, in operation 306, a determination is made that the user is a member, the method 300 may proceed to operation 310.

In operation 310, the interface 102 may present the member with a personalized webpage (i.e., "fanpage"). In the fanpage, the interface 102 may allow the member to indicate music artists (i.e., bands), other members, and advertisers (i.e., brands) that the member may like. The music artists, other members, and advertisers may be selected from a searchable list or entered with auto-fill capability.

The member may send a prospective member(s) an invitation via email from the interface 102. The member may send fan mail to a music artist via email from the interface 102. The member may send a message to an advertiser (e.g., a corporate sponsor) via email from the interface 102. The member may send a message to the system 300 operator to recruit a prospective advertiser. The email messaging from the interface 102 may protect the privacy of recipient email addresses. For example, a music artist's actual email address may not be visible to the member.

Once the member has indicated a music artist, another member, and an advertiser, each that the member may like, the member may then search for, sample, and select music for download to the first member computing device 108. With each music file (e.g., track) that is downloaded, the member may see an advertisement. The advertisement may be short (e.g., 8-10 seconds). The advertisement may be by an advertiser that the member indicated that the member liked. The advertisement may be a targeted consumer-focused video. The download may be controlled during the presentation of the advertisement. After the advertisement has been presented, the member may receive a less restricted version of the audio file for personal use on the first computing device 108. In other words, after the member is presented with the advertisement, the member may then use the music file on the first computing device 108 without having to view the advertisement again.

Even though the music file may be used on the first computing device 108 without advertisement, the music file may be subject to digital rights management, or other controls or limitations, to control how music may be sent to another member. In order to send the music file to another member, a member may use their fanpage to designate another member to receive the music file. The other member to receive the music file may be selected from a searchable list or entered with auto fill capability. Each recipient of the music file may be presented an advertisement from an advertiser selected by the first user before the music file may be played on, for example, the second member computing device 114. The advertisement may be the same or different from the advertisement associated with download of the content to the first user. In this manner, the first user's relationship with the second user is leveraged to present the second user with content that is desirable as well as advertising material that will be of interest to the second user.

The system 100 may also keep a running log of all music files that have been downloaded, and by which member. This log may be assessable by other members. This log may, similar to a music file, be assessable only after an advertisement is presented. This log may be used to create a "hotlist" of the most downloaded music files. This hotlist may be accessible via a member's fanpage.

Figure 4:
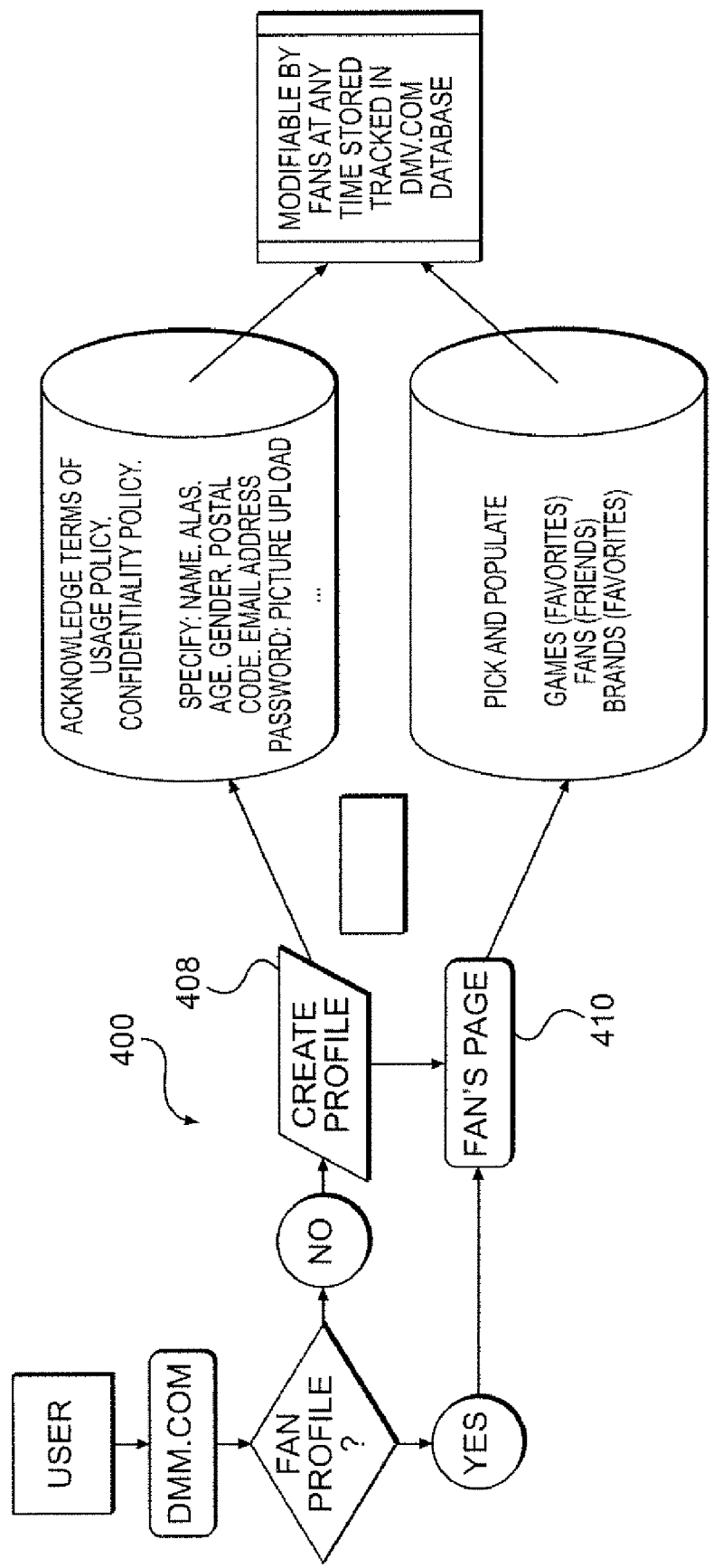
FIG. 4 is a schematic representation of an exemplary method 400 of creating a member profile and fanpage, such as operations 308 and 310 of FIG. 3.

FIG. 4 is a schematic representation of an exemplary method 400 of creating a member profile and fanpage, such as operations 308 and 310 of FIG. 3.

Before turning to creation of a profile, it should be noted that after creation of the profile, the member's alias (e.g., login name) and password (by way of, for example, an encrypted cookie) may be stored locally to provide pre-authenticated access from the first member computing device 108.

Further, it should be noted that although only a member alias and password may be necessary to login to the system 100 (regardless of whether the first or second member computing device 108, 114 is used), each authentication may involve additional authentication information. This additional authentication information may be used to track member connectivity for purposes of various services, to forestall usage abuse, and to achieve standards for non-repudiation. This additional authentication information may include a computing device's MAC address, IP address (which may be reduced to a subnet), operating system (OS) identifier, and browser identifier. This additional authentication information along with the member alias may be tracked, compiled, and hashed to form a user identifier (UID) for the system 100.

Turning back to FIG. 4, in operation 408, a user may be prompted to create a profile. The user may be required to acknowledge terms of usage and confidentiality of the system 100. The user may be required to specify the user's name, desired alias, year of birth, gender, postal code, non-system 100 email address, and a password. The user may upload a pictorial identifier (e.g., a picture of themselves, or another image).

Upon submission of the user information, the system 100 may perform multiple operations:

The member alias, additional authentication information, and password may be hashed into two tables: one for UIDs and the other for passwords. These two tables may be stored in the staging database 104. Upon completion of the profile, this information may be stored in the production database 106.

Other member profile information may be similarly stored and tracked in appropriate tables in the staging database 104. Upon completion of the profile, this information may be stored in the production database 106. Member profile information may be accessible and modifiable by members through the interface 102.

The interface 102 may then display a staging webpage that may indicate profile submission, summarizes profile information, stipulates that the user may be asked to complement this basic information with other elements, summarizes the confidentiality policy, and alerts the user to check the user's non-system 100 email address for a message, and to follow the message's instructions within a time period in order to complete the profile. The time period maybe 24 hours.

The system 100 may send an email message to the user's existing email address. Delivery of the message may be tracked and confirmed. The message may confirm that the user has submitted a profile. The message may provide a link to a system 100 welcome webpage. The link may function if it is selected within the time period. The link may be formed based on a URL and non-recyclable hashed UID and password. If the email message is undeliverable or if the user does not follow the link to the system 100 welcome webpage within the time period, the staging database 104 entries for the user may be deleted.

Once the user clicks the link and arrives at the system 100 welcome webpage, the system 100 may perform multiple operations:

The member profile information may be stored in the production database 106. This storing operation may render the user a member.

The system 100 may create a system 100 email account for the member. The system 100 email account may be accessible by the member only through the interface 102. POP, IMAP, or other non-system 100 access to the system 100 email may not be available. The system 100 email account may be used to send outgoing email to non members. The system may have POP functionality to send outgoing email. An email client may be embedded in the fanpage.

The system 100 may create a generic personal fanpage. The fan page may be created and modified with various templates, skins, and other customizable features and capabilities.

The member may be advised of the member's system 100 email account and fanpage 410. the member may be autodirected, after a period of time, to the member's personal fanpage 410 for the customization and completion of subsequent operations.

The personal fanpage may offer embedded chat, blog, and web-to-SMS capabilities. The personal fan page may offer a track clipping capability to make custom ringtones and digital-content uploads for video blogs and videocasts, which may be stored and tracked in the system 100. The track clipping capability may prevent uploading of particular files (e.g., mp3/4 and other standard music formats) or otherwise protect artists' intellectual property. Significantly, the fan page can include a list of other members, or potential members, such as friends, a list of preferred music artists and/or genres, and a list of potential advertisers.

In subsequent visits, the system 100 may take the member to the member's personal fanpage from which the member may customize the fanpage further. Customization may take place over a secure http session.

Music Artist Use

Music artists may be in either of two categories with respect to their market status: established and "indie." Established artists, whether signed by a record label or not, may be known to the market, and may have a track record and some music-distribution mechanism or arrangement, whether through a label or a self-service website. Indie artists may be up and coming artist and may or may not be signed by a label.

Established artists may have, for example, a sponsoring label, management, and distribution through physical or digital media. Established artists may have an online presence, either self-service or through proxy (e.g., a reseller). Established artists may be represented on existing content distribution systems. Established artists may have a market following of some magnitude, which may vary by artist and label status. Indie artists may have some online presence, either self-service or through proxy. Indie artist may have a limited market following. Their status may be "new," and they may seek greater exposure that may culminate in a label and record deal and management with services that may enable them to have wider reach into various markets beyond their locale.

Referring to FIG. 5, in operation 312, a music artist, either established or indie, may use the artist computing device 110 to register and to access the system 100. Similar to a member's personal fanpage, a registered music artist may have a personal webpage (i.e., "bandpage"). Attributes of the bandpage may be similar to attributes of the fanpage. The registered music artist may upload music files to the system 100 to be sampled, validated, and distributed on the system 100. The uploaded music files may be distributed with advertisements. A registered music artist may receive a portion of a payment received from an advertiser. The personal bandpage may include member (or fan) market demographics. The system 100 may also track and otherwise report member market demographics. The member market demographics may be presented with drilldown capabilities.

An artist may benefit from such market demographic data. The system 100 may include the capability to track by gender, age, and postal code, the concentrations of members validating and distributing the music artist's music files.

Advertiser Use

Advertisers (i.e., brands) may be in one of three categories: corporate, non-profit, or governmental. Such advertisers may seek to raise market awareness and to win preferred access to consumers, such as users of the system 100 that may share a market affinity such as music. In addition, the market demographic data and commercial behavior data that may be provided by members and tracked and reported by the system 100, may provide insight for advertisers to target-market to their preferred sub-demographics through the interface 102 without violating member privacy.

By sponsoring a music artist's music file for a member's validation, download, and distribution, an advertiser may build a member's stated brand loyalty and secure the right to be selected by the consumer to offer further promotions, make up-sells, and sponsor other member-specific, artist leveraged events, both physical (e.g., concerts) and virtual (e.g., webcasts).

The system 100 may enable the advertiser's advertising material (e.g., logo) to be presented at multiple times during a member's use of the system 100. For example and not by limitation, with each music file that is downloaded, and at multiple times in the process of members seeing other members' fanpages, members may see an advertiser's logo. This may enable direct access to a preferred demographic in a captive, otherwise only indirectly accessible, market. A music file sponsored by an advertiser may be presented to users for free download or distribution without the need to independently select the advertiser once the music has been selected. That is, music and advertisements can be associated with one another in a predetermined manner. For example, a particular song track can have a particular advertisement associated therewith by a previous user. Subsequent download/distribution of that song track can have the advertisement automatically associated therewith.

In operation 314, an advertiser may use the advertiser computing device 112 to register and to access the system 100. Similar to a member's fanpage and a music artist's bandpage, a registered advertiser may have a personal webpage (i.e., "brandpage"). Attributes of the brandpage may be similar to attributes of the fanpage and bandpage. The personal brandpage may include metrics pertaining to members' adoption of an advertisement or brand, and impressions made. Generic and non-personal market demographic information and member commercial behavior (e.g., specification of other advertisers) may be reported to an advertiser for instantaneous, at-a-glance review with drill down capabilities to calculate the advertiser's marketing return on investment (ROI) on the fly and per historical metrics.

The system 100 may serve as an intermediary between users (i.e., members), artists, and advertisers. The system 100 may protect the interests of users, artists, and advertisers. For example, the system 100 may protect the names of members, the intellectual property of artists, and the interests of advertisers. The system 100, in one embodiment, may take the form of a social lifestyle networking site that may conjoin members, artists, and advertisers.

While various embodiments in accordance with the present invention have been illustrated and described, they are not intended to be exhaustive or to limit the invention to the precise form disclosed. Those of skill in the art will recognize certain modifications, permutations, additions, and combinations of those embodiments are possible in light of the above teachings or may be acquired from practice of the invention. Therefore, the present invention also covers various modifications and equivalent arrangements that would fall within the purview of the appended claims and claims hereafter introduced.

What is claimed is:

1. A method of distributing content and advertising material, comprising:
    registering, using a computing device, members who are potential users and distributors of content;
    receiving, from a first member, using a computing device, an identifier of a second member with whom the first member has a relationship;
    receiving, from the first member, using a computing device, a selection of content to be distributed to the second member;
    receiving, using a computing device, a selection of advertising material to be associated with the content to be distributed to the second member;
    rendering, using a computing device, the advertising material on a computing device associated with the second member; and
    after said rendering step has begun, downloading the content to a computing device associated with the second member.

2. A method as recited in claim 1, wherein said step of receiving an identifier of a second member comprises receiving a selection, from the first member, of the second member from amongst a list of members.

3. A method as recited in claim 1, wherein said step of receiving a selection of advertising material comprises receiving a selection, from the first member, of an advertiser from amongst a list of advertisers.

4. A method as recited in claim 1, wherein said downloading step begins after the rendering step has started but before said rendering step has completed.

5. A method as recited in claim 1, wherein said step of receiving a selection of advertising material comprises selecting an advertiser who has agreed to sponsor the selected content.

6. A method as recited in claim 1, wherein said downloading step is accomplished after the rendering step has completed.

7. A method as recited in claim 1, wherein said downloading step comprises downloading the content as a file that does not include the advertising material.

8. A method of distributing digital music and advertising material, comprising:
    presenting, using a computing device, a first member of a digital music and advertising material superdistribution system with an interface, of the computing device;
    receiving, through the interface, an identifier of a second member with whom the first member has a relationship;
    receiving, through the interface, a selection of digital music to be distributed to the second member;
    receiving, through the interface, an indication of a preferred advertiser;
    associating, using a computing device, the digital music to be distributed to the second member with advertising material from the preferred advertiser; and
    distributing, using a computing device, the digital music as a first file and the advertising material as a second file to the second member, wherein the first file and the second file are separate files.

9. A method as recited in claim 8, wherein said step of presenting the first member with an interface comprises presenting the first member with a webpage.

10. A method as recited in claim 9, wherein said step of presenting comprises presenting the first member with a personalized webpage.

11. A method as recited in claim 10, wherein said step of receiving of a selection of digital music comprises receiving a selection of digital music from a musical artist included in the personalized webpage.

12. A method as recited in claim 8, further comprising tracking the distributing of the digital music and the advertising material.

13. A method as recited in claim 8, wherein said distributing step comprises downloading the first file and streaming the second file.

14. A content and advertising material superdistribution system, comprising:
    an interface to register members who are potential users and distributors of content; and
    a processor of a first user computing device configured to carry out the following process:
    receiving, from a first member, an identifier of a second member with whom the first member has a relationship;
    receiving, from the first member, a selection of content to be distributed to the second member;
    receiving a selection of advertising material to be associated with the content to be distributed to the second member;
    presenting the advertising material to the second member;
    rendering the advertising material on a computing device associated with the second member; and
    in response to said rendering step, downloading the content to a computing device associated with the second member.

15. The system as recited in claim 14, wherein the said step of receiving, from a first member, an identifier of a second member comprises receiving a selection, from the first member, of the second member from amongst a list of members.

16. The system as recited in claim 14, wherein said step of receiving a selection of advertising material comprises a first user computing device receiving a selection, from the first member, of an advertiser from amongst a list of advertisers.

17. The system as recited in claim 14, wherein said rendering step begins prior to the downloading step.

18. The system as recited in claim 17, wherein said downloading step begins after the rendering step has started but before the rendering step has completed.

* * * * *